United States Patent

[11] 3,580,068

[72] Inventor Louis S. Hoodwin
 Rte. 1, Box 246, Sawyer, Mich. 49125
[21] Appl. No. 755,361
[22] Filed Aug. 26, 1968
[45] Patented May 25, 1971

[54] APPARATUS FOR TESTING ROTARY POWER TRANSMITTING COMPONENTS
5 Claims, 1 Drawing Fig.

[52] U.S. Cl. .................................................. 73/162
[51] Int. Cl. .............................................. G01m 13/02
[50] Field of Search ..................................... 73/162,
 70.1, 116, 510; 33/179.5

[56] References Cited
UNITED STATES PATENTS
3,280,624 10/1966 Weinert......................... 73/162

*Primary Examiner*—Richard C. Queisser
*Assistant Examiner*—John Whalen

ABSTRACT: This invention describes apparatus for testing rotary power transmitting components by measuring the differential angular accelerations between the inputs and outputs of such components.

PATENTED MAY 25 1971      3,580,068
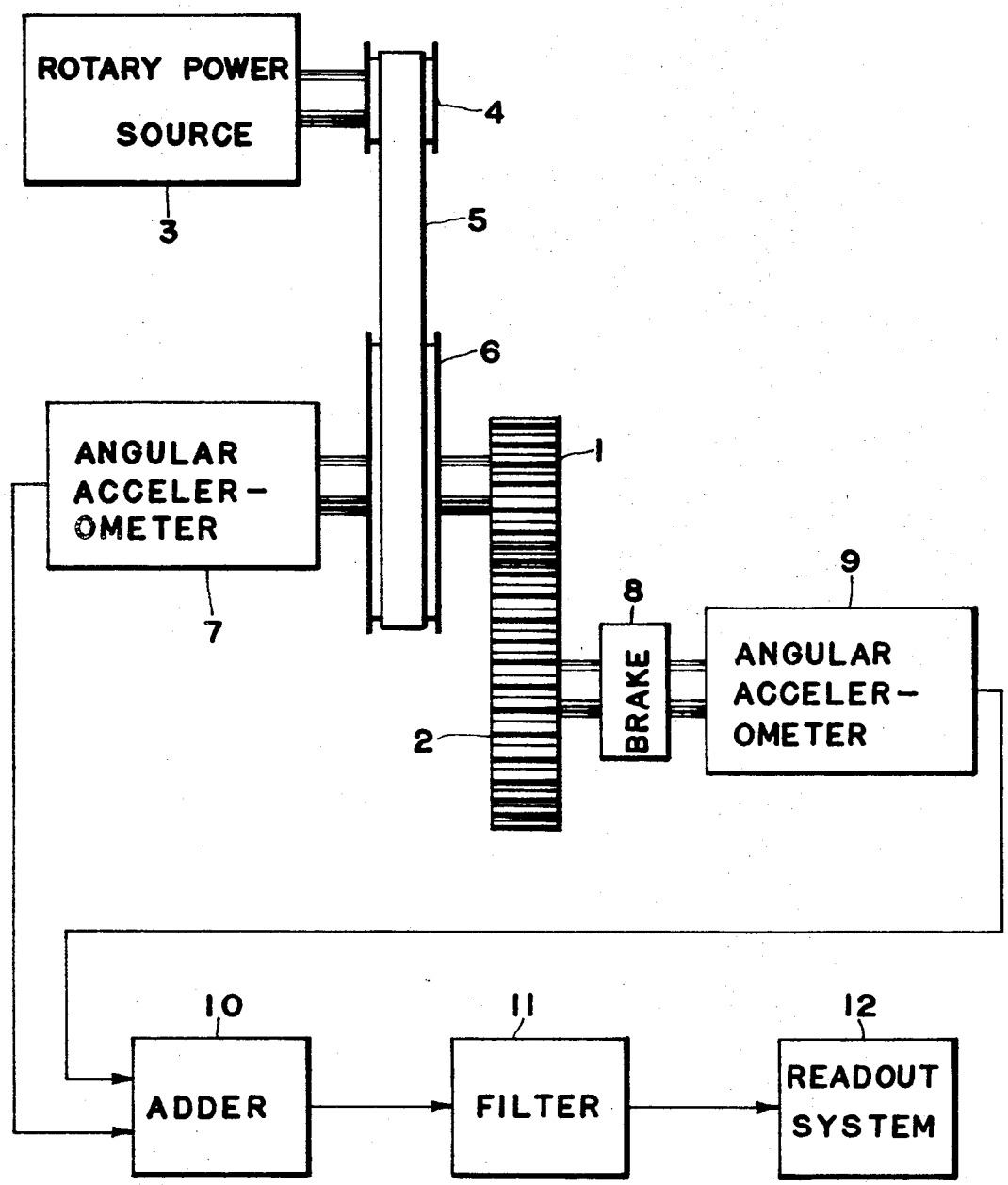
INVENTOR
Louis S. Hoodwin

APPARATUS FOR TESTING ROTARY POWER TRANSMITTING COMPONENTS

This invention pertains to apparatus for determining the dimensional accuracy and the operating characteristics of mechanical components for transmitting rotary motion.

An object of this invention is to provide a means of testing rotary power transmitting components or transmission train under conditions similar to those that will be encountered in actual operation.

Another object of this invention is to provide testing apparatus that determines speed variations caused by rotary power transmitting components or transmission train.

In order to explain the operation of this invention, a detailed description will be given to show its use in testing gears. Other components such as pulleys and belts, chains and sprockets, fluid couplings, mechanical couplings, and universal joints may be tested in a similar manner.

Most gear testing machines currently in use measure the variations in the distance between the centers of a pair of gears when they are rotated with a constant force keeping them in tight mesh. This type of test does not indicate how the gears will perform in actual use when the center distance is fixed and a torque load is applied which may distort the shapes of the teeth.

A perfect set of gears designed for uniform rotation will produce a constant speed output when driven at a constant speed. Variations in output speed will be due to faults in the dimensions of the gears.

The details and the functioning of this invention will be described with the aid of the accompanying drawing which shows a diagrammatic view of apparatus that utilizes this invention. In the drawing, details such as bearings, slides, stops, bases, supports, adjusting screws, etc. that are common to the design of machinery have been omitted for simplicity.

As indicated in the drawing, gears 1 and 2 to be tested are driven by a rotary power source 3, a pulley 4, a belt 5, and another pulley 6. An angular accelerometer 7 is driven from the shaft of the input gear 1. A brake 8 and another angular accelerometer 9 are driven from the shaft of the output gear 2. The electrical outputs of the accelerometers are combined in an adder 10 from which the resultant signal goes through a filter 11 to a readout system 12. Any of the common means may be used for adjusting the gear shafts for center distance, offset, and angle so as to duplicate the designed operating conditions of the gears under test. Although the rotary power source 3 is shown in a pulley and belt drive and the angular accelerometers 7 and 9 and the brake 8 are shown in direct drive, all elements of the apparatus except the gears may be coupled by any of the common mechanical means with the restriction that the coupling between the accelerometers and their respective driving gears must be capable of transmitting adequately the motion of the gears without introducing accelerations of such magnitude or frequency as to interfere with the measurement of accelerations produced by the gears.

The angular accelerometers 7 and 9 should preferably be of the electromagnetic, self-generating, nonseismic type with shaft inputs. They must have sufficient frequency response to measure the relevant accelerations produced by the gears. For example, if runout, tooth to tooth errors, and tooth nicks are all to be measured in a two gear system the largest gear of which has 100 teeth and is turning at one revolution per second, the slowest runout accelerations will occur at one cycle per second, the tooth to tooth accelerations will occur at 100 cycles per second with possible higher harmonics, and some nicks may require a frequency response of more than 500 cycles per second for clear detection.

If the rotary power source 3 turns at a constant speed and if the pulleys 4 and 6 and the belt 5 and the gears 1 and 2 are perfect, both gears will turn at constant speeds and the electrical output of each angular accelerometer 7 and 9 will be negligible.

If the gears 1 and 2 are faulty, forces will be generated where they contact each other that will produce angular accelerations of their shafts. These forces are opposing and therefore accelerate the gear shafts in opposite directions. In order to determine the total angular accelerations caused by the gear faults, the outputs of the accelerometers are added in phase by the adder 10 for gear shaft accelerations in opposite directions. Provisions are made in the adder 10 for adjusting the signal level from each accelerometer before adding so that the effective sensitivity of each accelerometer is proportional to its gear diameter. The gain controls in the adder 10 have been properly adjusted when an acceleration imposed on either gear shaft from outside the gear train produces a minimum output from the adder.

The pulley 6 is constructed with a compliant section between its hub and its outer mass in order to prevent pulley resonances and to help isolate vibrations caused by the power source, pulleys, and belt. This compliant construction also decouples the input gear shaft from the inertia of the drive system thereby permitting the input gear shaft to follow the tooth to tooth accelerations more easily.

Because of phase shifts at higher frequencies, not all of the electrical outputs due to accelerations impressed on the gears from the drive or brake systems will be cancelled. These unwanted signals may be removed by the filter 11.

The readout system may consist of an oscilloscope, an alternating current voltmeter, a strip chart recorder, or other devices depending on the characteristics of the acceleration signals and the requirements of the user. As examples, an alternating current voltmeter may be used to obtain an indication of overall tooth to tooth noise level, an oscilloscope will show the actions of individual pairs of teeth, and an oscillograph recorder will provide a permanent record showing runout, tooth to tooth errors, and surface defects noise.

The brake 8 may be adjusted to suit the requirements of the test. For lightly loaded gears, the braking torque may be adjusted to a value that will just keep the gears in constant mesh. In other cases, the braking torque may simulate overload conditions where tooth error accelerations operating on high inertial loads may produce damaging stresses. Various means of torque loading the components under test may be used. Instead of the simple brake 8 shown, the torque loading system could consist of a differentially adjusted, spring-loaded feedback drive which couples the output shaft to the input shaft. Such a system permits very large torques to be applied to the components under test while a low torque power source is used to rotate the entire moving assembly.

Components other than gear sets may be tested by mounting and driving them in the above described apparatus in place of the gearset. If the component to be tested has its own integral input and output shafts, the shafts of the testing apparatus need to be adjustable only to the extent of being able to be coupled to the shafts of the component. By using mechanical couplings, this adjustment ability does not need to be as precise as in the case where gears are mounted on the testing apparatus shafts. It is only necessary that the shafts of the testing apparatus and the component align accurately enough so that the couplings between the component shafts and the accelerometers do not generate excessive accelerations.

I claim:

1. Apparatus for testing rotary power-transmitting components or transmission trains having separate, mechanically coupled, rotatable, input and output means comprising;
    a means of rotating the input means of the component being tested,
    an angular accelerometer driven from the input means of the components, or transmission trains
    an angular accelerometer driven from the output means of the components, or transmission trains
    a means for combining the electrical outputs of the accelerometers so that the outputs add for accelerations caused by the components or transmission trains being tested,
    and a means for displaying or utilizing the combined electrical outputs of the accelerometers.

2. Apparatus as described in claim 1 with supports on which the input and output means of the components to be tested are mounted, with means for adjusting the supports so as to obtain a desired physical relation between the input and output means.

3. Apparatus as described in claim 1 with the addition of a means for adjusting the effective sensitivities of the accelerometers individually.

4. Apparatus as described in claim 1 with the addition of a means for filtering out of undesired frequencies either in the individual accelerometer outputs or in the combined accelerometer outputs.

5. Apparatus as described in claim 1 with the addition of a means for applying a torque load on the component or transmission train being tested.